United States Patent [19]
Andress et al.

[11] Patent Number: 5,560,330
[45] Date of Patent: Oct. 1, 1996

[54] INTAKE MANIFOLD AND PROCESS FOR MAKING IT

[75] Inventors: Heinz Andress, Erdmannhausen; Volker Ernst, Sachsenheim; Rolf Fuesser, Ingersheim; Arthur Klotz, Remseck; Rudolf Leipelt, Marbach, all of Germany

[73] Assignee: Filterwerk Mann & Hummel GmbH, Ludwigsburg, Germany

[21] Appl. No.: 335,796

[22] PCT Filed: Apr. 16, 1993

[86] PCT No.: PCT/EP93/00925

§ 371 Date: Nov. 15, 1994

§ 102(e) Date: Nov. 15, 1994

[87] PCT Pub. No.: WO93/23666

PCT Pub. Date: Nov. 25, 1993

[30] Foreign Application Priority Data

May 16, 1992 [DE] Germany ............... 42 16 255.6

[51] Int. Cl.$^6$ .................. F02M 35/10; F02M 35/12; F02M 35/14
[52] U.S. Cl. ........................................... 123/184.53
[58] Field of Search ............... 123/184.53, 184.57, 123/184.61, 184.56

[56] References Cited

U.S. PATENT DOCUMENTS

| | | |
|---|---|---|
| 3,990,414 | 11/1976 | Malphettes . |
| 3,990,415 | 11/1976 | Malphettes . |
| 4,538,556 | 9/1985 | Takeda ............... 123/184.53 |
| 4,543,918 | 10/1985 | Ma ................... 123/184.53 |
| 4,546,733 | 10/1985 | Fukami et al. ........ 123/184.57 |
| 5,243,933 | 9/1993 | Mukawa .............. 123/184.61 |
| 5,377,629 | 1/1995 | Brackett et al. ....... 123/184.56 |

FOREIGN PATENT DOCUMENTS

| | | |
|---|---|---|
| 379926 | 8/1990 | European Pat. Off. . |
| 2171228 | 9/1973 | France . |
| 2209405 | 6/1974 | France . |
| 1669265 | 12/1953 | Germany . |
| 2205220 | 8/1973 | Germany . |
| 59-49361 | 3/1984 | Japan . |
| 59-118435 | 7/1984 | Japan . |
| 61-190158 | 8/1986 | Japan . |
| 4-004123 | 1/1992 | Japan . |
| 1372506 | 10/1974 | United Kingdom . |

*Primary Examiner*—Marguerite McMahon
*Attorney, Agent, or Firm*—Evenson, McKeown, Edwards & Lenahan

[57] ABSTRACT

The proposal is for a suction pipe consisting of a number of individual suction pipes (10, 16, 17, 18) connected on the intake side to a manifold (11). According to the invention, the manifold is made in one piece with the suction pipes by the blow-molding method.

15 Claims, 4 Drawing Sheets

INTAKE MANIFOLD AND PROCESS FOR MAKING IT

The invention relates to an intake manifold and a process for making it.

A thermoplastic intake manifold is known from Published German Patent Application DE-OS 38 38 921. This intake manifold is produced according to the so-called core melt-out process; i.e., a core is produced first from a tin bismuth alloy having a low melting point. This core is placed in a mold. A remaining space between the mold and the core is filled with a thermoplastic material by means of injection molding. Then, the core is melted out in a melt-out bath.

Furthermore, from Laid-open Japanese Patent Application 1-216067, a process is known for manufacturing an intake pipe from plastic material, in which case first two flange pieces are injection-molded from a thermoplastic material; then a branch pipe part is formed from a thermoplastic material by means of blowing; and the flange pieces and the pipe part are connected with one another.

A disadvantage of the known processes is the fact that several operating steps are required for producing the engine intake manifold. While, in the case of the melt-out technique, the producing and melting-out of the core requires considerable investments with respect to equipment; in the case of the manufacturing process according to Japanese Patent Document 1-216067, the separate manufacturing of the individual elements and the joining of the individual elements is not completely without problems with respect to inaccuracies of the fit.

It is an object of the invention to provide an intake manifold and a process for making it which can be carried out in a simple manner and without high tooling costs.

Based on the preambles of the successive main claims, this object is achieved by means of the characteristics of their characterizing parts.

The process according to the invention is distinguished by the fact that the individual intake pipes and the manifold connecting the intake pipes on the intake side are formed in one piece. A substantial advantage of the invention is the fact that the intake manifold may be produced in a single process step and transition points or seams between the intake pipes and the manifold do not exist. Thus, a shaped intake manifold is produced which has very advantageous flow characteristics.

In accordance with a further development of the invention, it is envisioned to simultaneously mold a shunt resonator onto the intake manifold. Such a shunt resonator serves to reduce the sound radiation and comprises a hollow space which is connected by means of a small opening with the manifold. Such a shunt resonator may advantageously be integrated in the space between two intake pipes. Thus, this space can be utilized in an advantageous manner, while the outer dimensions of the intake manifold remain unchanged.

In accordance with a further development of the invention, the intake manifold is fastened directly to an air filter housing. A simple fastening method is to provide plug-type connections, for example, in the form of flange pieces which are arranged on the intake manifold and engage in recesses in the filter housing.

It is also possible to provide a shunt resonator in the air filter housing. By way of an opening, this shunt resonator may be connected with the manifold or with the clean-air space of the air filter housing. The important thing for a shunt resonator is that it is arranged close to the noise source. This is assured by connecting the shunt resonator on the clean-air side.

In accordance with a further embodiment of the invention, a so-called resonator can be arranged in the manifold. This is a short pipe piece which causes a cancellation of sound waves of a defined frequency. The length of the pipe piece is determined by the sound waves and amounts to lambda/4.

In order to connect the intake pipes to the engine block, connecting flanges may advantageously be provided which are connected with the intake pipes by way of a plug-type or a welded connection. The connection between the clean-air outlet of the air filter and the intake of the manifold is suitable for arranging an air mass sensor or an air flow meter and/or a throttle valve. The above-mentioned elements may be built-in into this connection as a complete module.

In accordance with another manufacturing variant for the intake manifold, the intake pipes and the manifold are made by means of the blow-molding method, the manifold being open on one side. After the manufacturing, this opening is closed off by means of a cover element. This manufacturing process may be used where intake manifolds of a particularly complicated shape are required and a closed manifold and the intake pipes cannot be produced together by the blow-molding method.

These and other characteristics of preferred further developments of the invention, in addition to being described in the claims, are also disclosed in the specification and the drawings, in which case the individual characteristics may each be implemented alone or in the form of subcombinations in the case of the embodiment of the invention and may be implemented in other fields and may represent advantageous embodiments as well as embodiments that can be protected separately for which a protection is claimed here.

Embodiments of the invention are illustrated in the drawings and will be explained in more detail in the following.

Figure 1:
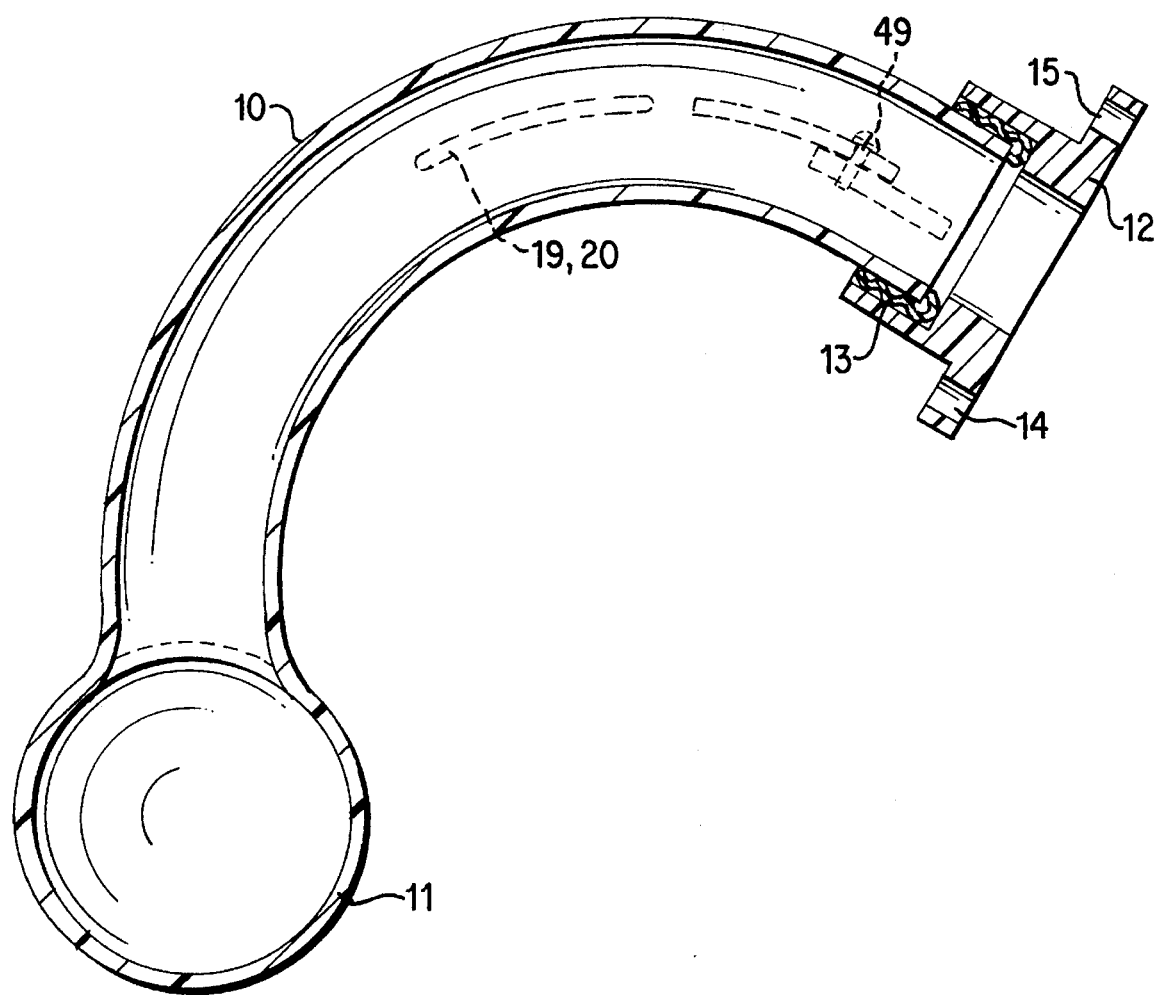
FIG. 1 shows a sectional view of an intake manifold.

The sectional view according to FIG. 1 shows an intake manifold comprising an intake pipe 10 and a manifold 11. The intake pipe and the manifold are constructed in a single piece and are made by the blow-molding method. A flange 12 is situated in the air outlet area on the intake pipe 10. This flange is pushed over the intake pipe 10 and is screwed to the intake pipe by means of the threaded connection 49. A seal between the flange 12 and the intake pipe 10 takes place by means of a seal 13 which is constructed with an undulating shape and which seals radially as well as axially. The flange 12 is provided with bores 14, 15 for receiving screw connecting elements. By way of this flange 12, the intake manifold is screwed to a cylinder head of an internal combustion engine.

Figure 2:
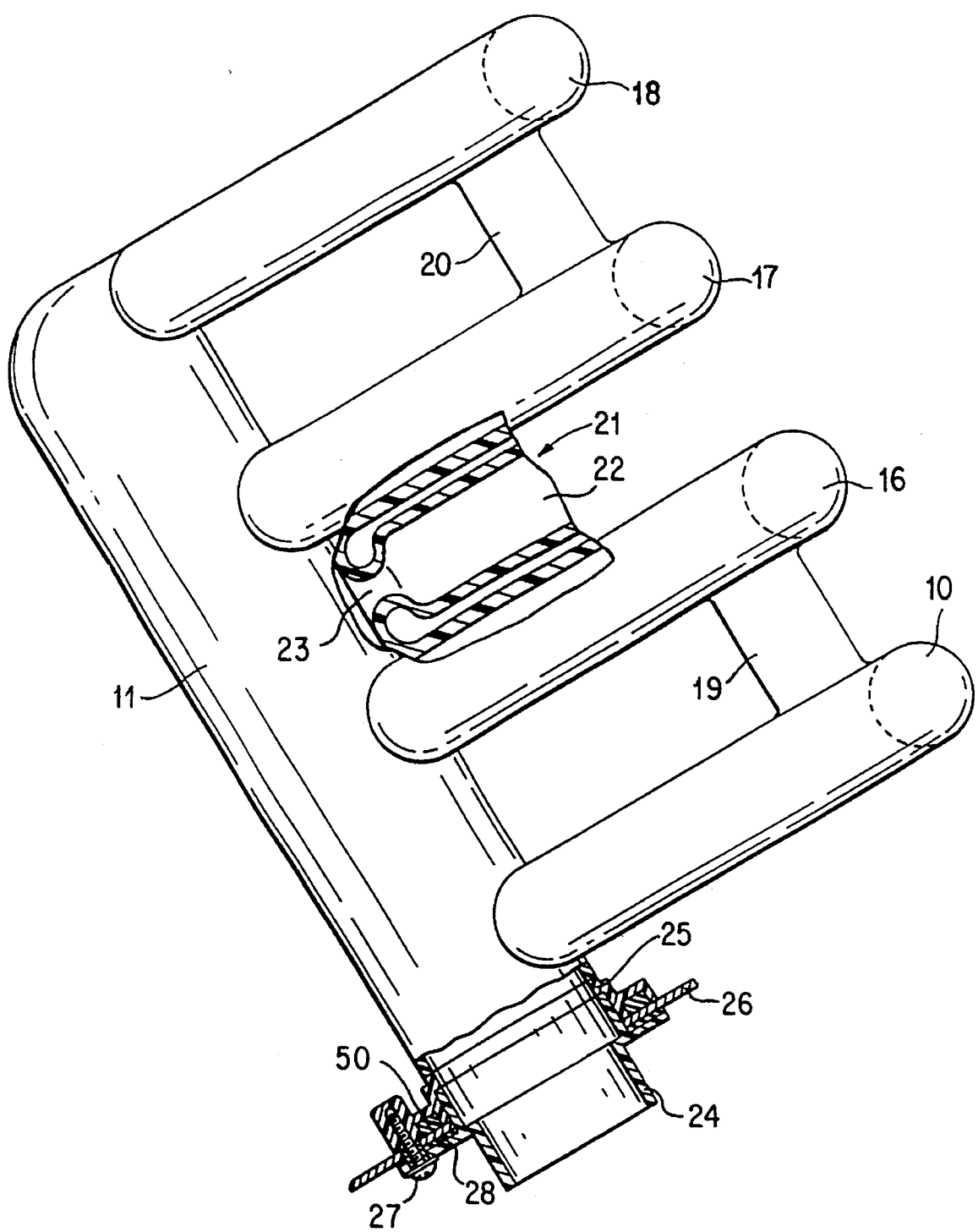
FIG. 2 shows a top view of the intake manifold illustrated in FIG. 1.

In FIG. 2 the intake manifold is shown in a top view. Here, the manifold 11 can be recognized with four intake pipes 10, 16, 17, 18 which are molded thereon. The adjacently situated intake pipes 10, 16 and 17, 18 are each equipped with a connection web 19, 20. These webs increase the rigidity of the whole system and are, at the same time, also used for screwing the intake pipes to the two double flanges via the threaded connection 49.

Between the intake pipes 16, 17, there is a so-called shunt resonator 21. This shunt resonator 21 comprises a hollow space 22 which is laterally bounded by the walls of the intake pipes 16, 17. An opening 23 to the manifold 11 is provided. Through this opening, the hollow space of the shunt resonator 21 is operatively connected with the space of the manifold 11. The shunt resonator serves to damp certain frequencies of the intake noise and at the same time also to increase the rigidity between the two adjacently situated intake pipes.

A connecting flange 24 is situated on the air intake opening of the manifold. A carrier plate 26 is arranged between the connecting flange 24 and the manifold opening 25. By way of screws 27, the connecting flange 24 is connected with the manifold opening 25 and is at the same time fixed to the carrier plate 26. Seals 28, 50 are also provided which prevent outside air from entering the intake system.

Naturally, it is also possible to arrange the shunt resonator 21 between intake pipes 10, 16 or between intake pipes 17, 18. It is also possible to provide several shunt resonators. Due to the simplicity of manufacturing the intake manifold by the blow molding method, such shunt resonators can be arranged in any desired configuration.

Figure 3:
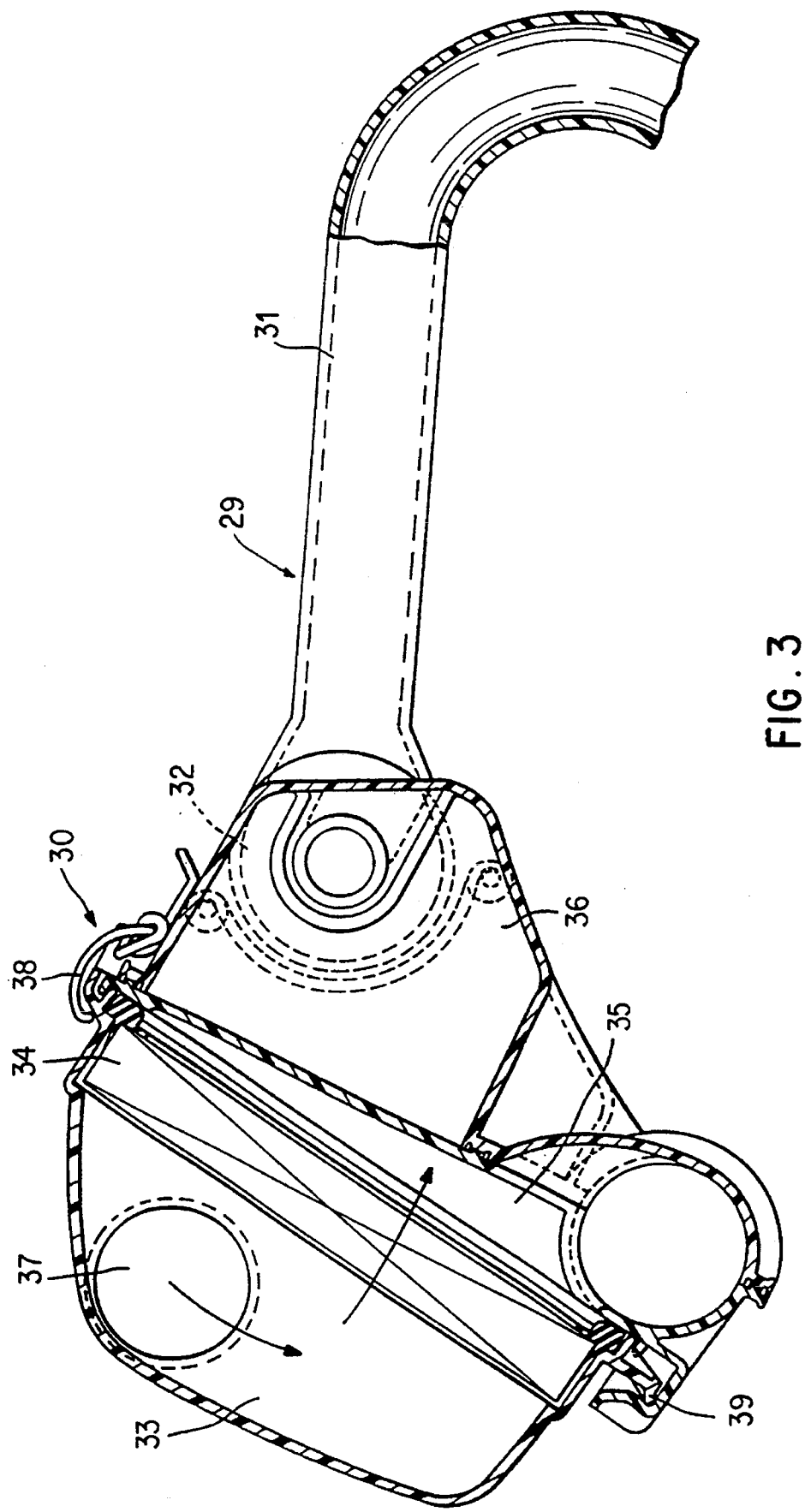
FIG. 3 shows a sectional view of an intake manifold with an air filter.

The intake manifold 29 illustrated in FIG. 3 is partially integrated into the filter system 30. The intake manifold 29 likewise comprises four intake pipes—of which intake pipe 31 is visible—as well as manifold 32. Manifold 32 is arranged in a recess of the filter system 30. The functional relationship between the manifold 32 and the filter system will be explained in detail below.

The filter system 30 comprises an unfiltered-air space 33, a filter cartridge 34, a clean-air space 35 as well as a shunt resonator 36. The air to be filtered flows through the opening 37 into the unfiltered-air space, is filtered by way of the filter cartridge 34 and arrives in the clean-air space 35. The filter cartridge 34 is arranged in a receptacle in the unfiltered-air space. The filter system essentially comprises two housing parts which have an intersecting point on the filter cartridge 34. The two housing parts of the filter system 30 can be connected with one another by means of the plug-type hinge 39 and the snap (detent) latch 38.

Figure 4:
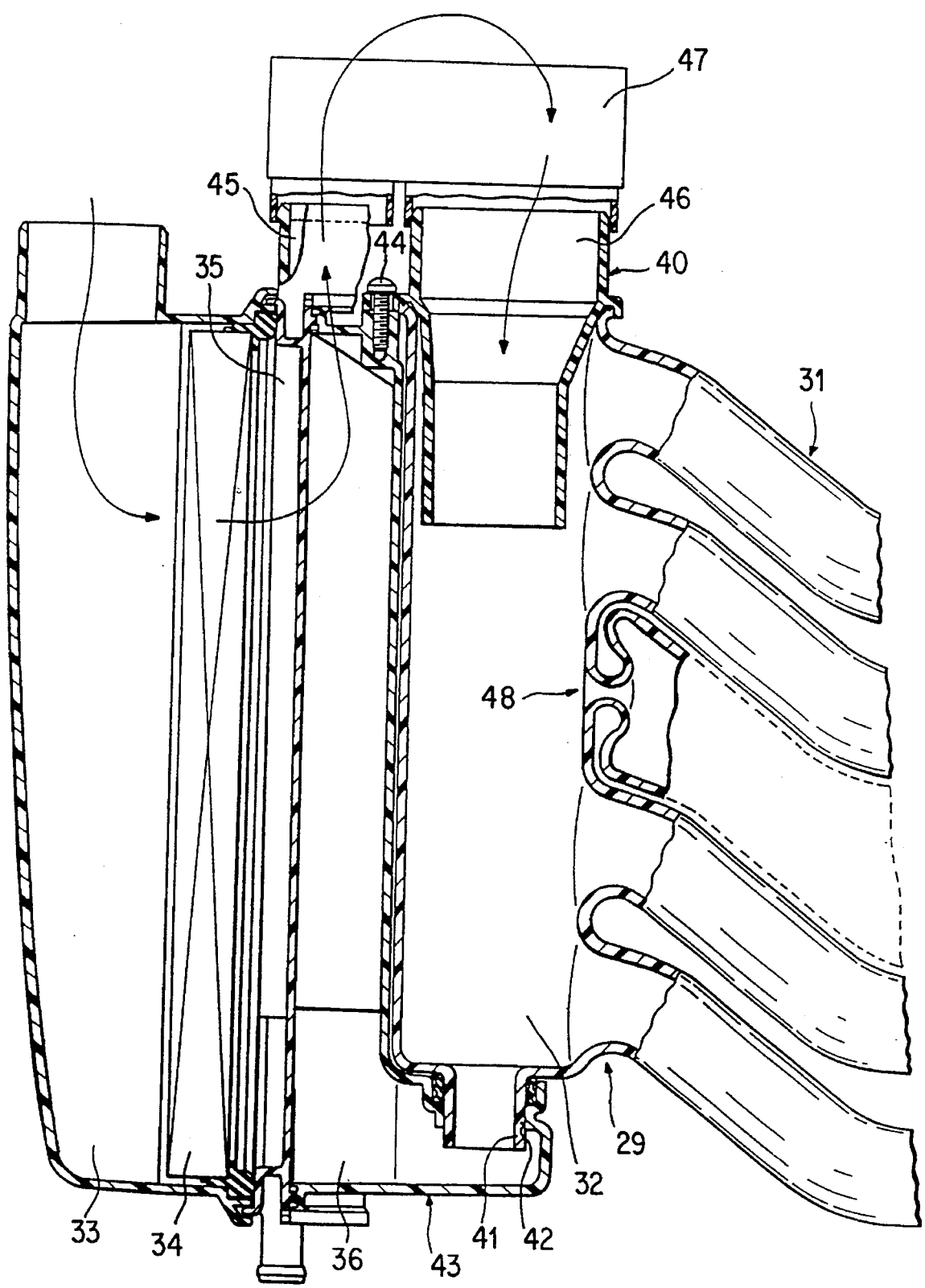
FIG. 4 shows a top view of the intake manifold/air filter system illustrated in FIG. 3.

FIG. 4 shows a top view of the system according to FIG. 3. A resonator 40 is situated in the manifold 32 of the intake manifold 29. This resonator may comprise an inserted pipe piece which is welded or glued to the wall of the manifold. On one end, the manifold 32 has a flange neck 41. This flange neck is fastened in an opening 42 of the filter housing 43. The opposite fastening takes place by means of a screw connection 44.

The flange neck 41 is open and leads into a closed-off hollow space inside the filter housing 43. This closed-off hollow space forms the shunt resonator 36. In addition or as an alternative, a resonator 40 is arranged in the manifold 32. This resonator 40 comprises a sleeve which is welded or glued to the manifold. A throttle valve 47 or an air flow meter or air mass sensor, which illustrated only schematically, is arranged between the air outlet opening 45 of the clean-air space 35 and the air intake opening 46 of the manifold. Naturally, these two openings may also be connected without any additional elements; for example, the throttle valve may also be arranged in the intake area of the air intake opening 46.

The intake pipes 31 are arranged in pairs. As an alternative, another shunt resonator may be arranged between the two center intake pipes as illustrated in FIG. 1. This shunt resonator is indicated by a broken line (shunt resonator 48).

| List of Reference Numbers | |
| --- | --- |
| 10 | intake pipe |
| 11 | manifold |
| 12 | flange |
| 13 | seal |
| 14 | bore |
| 15 | bore |
| 16 | intake pipe |
| 17 | intake pipe |
| 18 | intake pipe |
| 19 | connecting web |
| 20 | connecting web |
| 21 | shunt resonator |
| 22 | hollow space |
| 23 | opening |
| 24 | connecting flange |
| 25 | manifold opening |
| 26 | carrier plate |
| 27 | screw |
| 28 | seal |
| 29 | intake manifold |
| 30 | filter system |
| 31 | intake pipe |
| 32 | manifold |
| 33 | infiltered-air space |
| 34 | filter cartridge |
| 35 | clean-air space |
| 36 | shunt resonator |
| 37 | opening |
| 38 | snap latches |
| 39 | plug-type hinge |
| 40 | resonator |
| 41 | flange neck |
| 42 | opening |
| 43 | filter housing |
| 44 | screw connection |
| 45 | air outlet opening |
| 46 | air intake opening |
| 47 | throttle valve |
| 48 | shunt resonator |
| 49 | screw connection |
| 50 | seal |

We claim:

1. An intake manifold for an internal combustion engine comprising a plurality of intake pipes, a connecting manifold which connects the intake pipes, and a shunt resonator in communication with the manifold; wherein the intake pipes, the connecting manifold and the shunt resonator are formed by blow-molding as a single, unitary piece.

2. An intake manifold according to claim 1, wherein said shunt resonator is arranged between two adjacent intake pipes.

3. An intake manifold according to claim 1, where the connecting manifold which connects the intake pipes is mounted to an air filter housing.

4. An intake manifold according to claim 3, wherein the connecting manifold which connects the intake pipes is in communication with a filtered-air outlet of the air filter housing, and an air mass sensor, an air flow meter or a throttle valve is interposed between the filtered-air outlet of the air filter and the connecting manifold which connects the intake pipes.

5. An intake manifold according to claim 1, wherein a resonator for suppressing a sound wave having a characteristic frequency and wavelength ($\lambda$) is arranged in the connecting manifold which connects the intake pipes, said resonator having a length corresponding to ¼ the wavelength of the sound wave to be suppressed.

6. An intake manifold for an internal combustion engine comprising a plurality of intake pipes and a connecting manifold which connects the intake pipes; wherein the intake pipes and the connecting manifold are formed by blow-molding as a single unitary piece, and each intake pipe has an associated connecting flange arranged at amend thereof proximate said engine, and each intake pipe is connected to the associated connecting flange by means of a plug-type connection.

7. An intake manifold according to claim 6, wherein the connecting manifold which connects the intake pipes is mounted to an air filter housing.

8. An intake manifold according to claim 7, wherein the connecting manifold which connects the intake pipes is in communication with a filtered-air outlet of the air filter housing, and an air mass sensor, an air flow meter or a throttle valve is interposed between the filtered-air outlet of the air filter and the connecting manifold which connects the intake pipes.

9. An intake manifold according to claim 7, wherein the air filter housing further comprises a shunt resonator arranged therein, and said shunt resonator is in communication through an opening with the connecting manifold which connects the intake pipes.

10. An intake manifold according to claim 6, wherein a resonator for suppressing a sound wave having a characteristic frequency and wavelength ($\lambda$) is arranged in the connecting manifold which connects the intake pipes, said resonator having a length corresponding to ¼ the wavelength of the sound wave to be suppressed.

11. An intake manifold for an internal combustion engine comprising a plurality of intake pipes and a connecting manifold which connects adjacent ends of the intake pipes; wherein the intake pipes and the connecting manifold are formed by blow-molding as a single unitary piece, and the connecting manifold is formed with an opening in one side opposite the adjacent ends of the connected intake pipes.

12. A method of producing an intake manifold for an internal combustion engine comprising a plurality of intake pipes and a connecting manifold which connects the intake pipes, said method comprising blow-molding the intake pipes and connecting manifold from synthetic resin as a single, unitary piece.

13. A method according to claim 12, wherein said intake manifold further comprises a shunt resonator, and the shunt resonator is blow molded from synthetic resin with the intake pipes and the connecting manifold as a single, unitary piece.

14. A method according to claim 13, wherein said shunt resonator is arranged between two adjacent intake pipes and is provided with an opening which opens into the connecting manifold.

15. A method according to claim 12, wherein a resonator for suppressing a sound wave having a characteristic frequency and wavelength ($\lambda$) is provided in the connecting manifold, and said resonator has a length corresponding to ¼ the wavelength of the sound wave to be suppressed.

* * * * *